United States Patent [19]

Lee

[11] Patent Number: 5,231,570
[45] Date of Patent: Jul. 27, 1993

[54] CREDIT VERIFICATION SYSTEM

[76] Inventor: Gerritt S. K. Lee, P.O. Box 28028, Honolulu, Hi. 96827

[21] Appl. No.: 625,477

[22] Filed: Dec. 11, 1990

[51] Int. Cl.[5] .................. G06F 15/20; G06G 7/52
[52] U.S. Cl. ..................... 364/408; 364/918.3; 340/825.33; 235/380
[58] Field of Search .............. 364/401, 408, 918.3; 235/380; 340/825.33; 379/61

[56] References Cited

U.S. PATENT DOCUMENTS

| | | | |
|---|---|---|---|
| 3,564,210 | 2/1971 | Presti | 235/380 |
| 3,697,693 | 10/1972 | Deschenes et al. | 179/2 |
| 3,740,530 | 6/1973 | Hoffer et al. | 235/380 |
| 3,818,187 | 6/1974 | Lovendusky et al. | 235/380 |
| 3,891,830 | 6/1975 | Goldman | 235/380 |
| 3,938,090 | 2/1976 | Borison et al. | |
| 3,982,103 | 9/1976 | Goldman | 235/380 |
| 4,016,404 | 4/1977 | Appleton | |
| 4,264,782 | 4/1981 | Konheim | |

*Primary Examiner*—Roy N. Envall, Jr.
*Assistant Examiner*—Laura Brutman
*Attorney, Agent, or Firm*—Jones, Tullar & Cooper

[57] ABSTRACT

A credit card status verification system is disclosed in which the status of very large numbers of credit cards is contained and accessed from a compact storage media, such as a CD-ROM disk, at a remote location, thereby eliminating the necessity of obtaining the status information from a centrally located facility via a communication link. A data mapping algorithm is employed to map credit card numbers to status containing locations within memory without requiring large amounts of memory space for addressing. A multiple level screening process is employed for checking the validity of a credit card number and the credit status of a credit card which is both quick and economical.

9 Claims, 3 Drawing Sheets

CREDIT VERIFICATION SYSTEM

BACKGROUND OF THE INVENTION

The present invention relates in general to a credit verification system, and more particularly to a system for use with point-of-sale market transaction terminals which provides instant credit card status verification at the terminals.

Conventional credit card status verification techniques employ a verification terminal connected to a central computer via a dedicated or dial up data link, such as a telephone line. Such a configuration is described in U.S. Pat. No. 3,938,090 to Borison et al. The apparatus disclosed in this patent obtains a credit card number either through manual input or by scanning a magnetically encoded stripe on the card, and sends the card number via the data link to the central computer where the card's status is checked for approval or rejection.

The centralized nature of this scheme poses several potential problems. First, the verification response time is highly dependent on the amount of subscriber traffic directed to the time shared central computer and the grade of data transmission circuits employed. During peak hours, the response time may be increased due to traffic congestion, and in some foreign countries where the transmission facility grade is poor, this wait may be further prolonged by repeated dial-up attempts at the expense of customer convenience.

These types of systems are also susceptible to extended service interruptions resulting from central computer down time or malfunctions in the data link. Further, extensive monthly fees are accrued for the use of the data link and the central computer processing time. There is also the possibility with these types of systems that an unauthorized device could be inserted within the centralized network loop to provide a false verification indication.

Yet another drawback to prior art verification systems is that the central processor's database does not contain a comprehensive record store of all authentic card numbers allocated, both issued and unissued, because such a data set compiled in commercial format would demand a great deal of computer memory space and be costly to maintain. Instead, only records of "bad" credit cards are stored in the database so that verification is performed on an exception basis. As a result, it is impossible for the central processor to distinguish a genuine card number from a counterfeit one without the initiation of a discrepancy report, and this effectively prevents prior art systems from being able to detect fraud due to card alteration.

What is needed then is a credit status verification system which does not rely on a centralized computer and associated data links, and which provides status information for all credit cards, both issued and unissued.

SUMMARY OF THE INVENTION

In view of the foregoing, it is an object of the present invention to provide a credit verifying system having a fast response time that is not affected by subscriber traffic or the quality of a data link.

It is another object of the present invention to provide a credit verification system which is immune to service interruptions caused by computer downtime or data link malfunctions.

It is yet another object of the present invention to provide a credit verification system which eliminates communication link and central computer processing time costs.

A still further object of the present invention is to provide a credit verification system having increased immunity to fraudulent tampering.

It is yet another object of the present invention to provide a credit verification system which not only can determine the status of a credit card, but also can detect counterfeit credit card numbers.

These and other objects of the present invention are achieved through provision of a decentralized, local network based credit card status verifying system which is fully self contained and therefore does not require access to a central computer and its associated data links. Credit status information is stored in a database on a compact media, such as a CD-ROM disk, which can be periodically updated or replaced as necessary. The use of a compact storage media to store status information of very large numbers of credit cards is made possible by a unique data mapping algorithm which permits the entire record set of credit card numbers allocated to hundreds of issuing banks or financial institutions to be compactly and conveniently stored in the database. As a result of this convenience, stored credit information can be easily read at the retail transaction site via appropriate hardware to provide instant credit verification. The mapping algorithm also permits information to be stored regarding the numbers of all issued and unissued credit cards so that credit card number authenticity can also be instantly verified.

With the mapping algorithm, actual credit card numbers, or any other standard representations of them, are not required as part of the database. Instead, digital matrices composed of binary "ones" and "zeroes" are used as credit card status indicators. In the basic scheme, for example, a single digital bit which may be a "one" or a "zero", will indicate if a card is good or bad; a good card meaning one which has not exceeded its credit limit, while a bad card meaning one which has exceeded its credit limit or has either been lost, stolen, or expired. With the inclusion of additional digital bits, several grades of authorization may be incorporated to enhance the basic scheme.

The information needed to address the respective matrix and cell for credit verification is contained in the card number itself, and the entire verification process is controlled by the mapping algorithm. Because standard card number references are omitted from the database, and also because of the high-density formatting of the matrix indicators, a significant reduction in database size is achieved.

All credit card numbers employed with the invention are formulated by combining together multiple groups of numerical strings to form a composite number. The string groups are each assigned to a particular cell in an X-Y matrix so that each credit card number formulated from the string groups in the matrix can be identified by the unique set of row/column coordinates which pinpoint the location of the associated string groups inside the matrix. The algorithm of the present invention forms what is referred to as a mask number which is the consecutive ordering of the row number components in the matrix corresponding to the string groups of a particular credit card number. The mask number references a particular mask matrix which is one of many new matrices derived from the original X-Y matrix.

The cell address within the mask matrix is in turn obtained by inserting the column components from the X-Y matrix into two equations, a row equation and a column equation. When the cell in the mask matrix is addressed, one or more status information bits are obtained for the particular credit card associated with that cell. In this manner, the mapping algorithm provides for compact storage of status information for a very large number of credit cards that can be quickly and economically accessed.

The hardware employed to implement the system includes two subsystems: a retail system where credit verification is performed and a host system where credit card status updates and other administrative functions are performed. The retail system includes an array of verification terminals, a set of memory files for the matrix and program data and a file server or system processor which ties the terminals and the files together. An optional electronic file transfer system can be employed to download updated matrix data files from the host system to the retail system's archive. The host system has a similar configuration to the retail system, but in addition has a provision to enable credit status data to be added or modified. In addition, the host system also has provisions to initiate status updates by transferring electronic files to the retail system, or by allowing the creation of a new CD-ROM or magnetic tape by generating a dump file from the archive data set.

In the use of a preferred embodiment of the retail credit verification system, a credit card number is entered into one of the terminals and through software implementation of the mapping algorithm, the system processor calculates the associated mask number and mask coordinates by breaking down the credit card number into the X-Y matrix row/column components via reference to the X-Y matrix code files. During this process, a multiple level screening of the credit card number is performed to determine the validity of the card number. First, the first several digits of the number, which correspond to an issuer code, are compared with a table of issuer codes. If the card's issuer code is not in the table, the card number is rejected as being invalid.

The mask number is next generated from the X-Y matrix. If one or more strings of the credit card number are not found in the X-Y matrix, however, the card number is also rejected as being invalid.

After a valid mask number is formed, a third level of screening is performed by checking a status bit for the mask number which identifies whether or not the determined mask number has been activated. If not, the credit card is rejected as being inactive. Through these three levels of screening, the validity of an entered credit card number can be quickly and economically determined.

Once a valid and active mask number has been obtained, a fourth and final level of screening is performed during which the mask archive file is accessed using the mask number as its file name. Then, the appropriate record of the file is retrieved into RAM for examination of the status information associated with the credit card number using a digital template. An appropriate output is then provided to the verification terminal to display the credit status of the credit card.

BRIEF DESCRIPTION OF THE DRAWINGS

The foregoing and additional objects, features and advantages of the present invention will become apparent from the following detailed description of a preferred embodiment thereof taken in conjunction with the accompanying drawings in which.

DETAILED DESCRIPTION OF THE PREFERRED EMBODIMENT

Figures 1, 2:
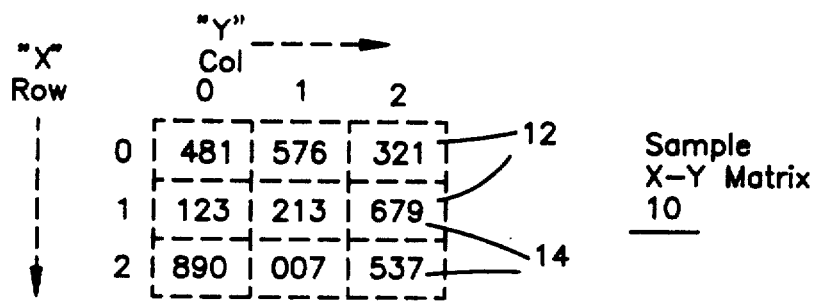
FIG. 1 is a sample X-Y matrix employed with a data mapping algorithm for the present invention which separates a credit card number into a plurality of multiple digit strings.
FIG. 2 is a sample mask matrix employed with the data mapping algorithm of the present invention which is used to address status information for a plurality of credit card numbers.

Turning now to a more detailed consideration of a preferred embodiment of the present invention, FIG. 1 illustrates a sample X-Y matrix 10 which is employed to formulate credit card numbers to be used with the credit verifying system of the present invention. The X-Y matrix 10 contains a plurality of cells 12, each of which contains a corresponding multiple digit string of numbers 14 which can be combined with one another in various permutations to form a plurality of credit card numbers. Each of the cells 12 is uniquely identified by an assigned row and column number so that each and every composite credit card number formulated from the X-Y matrix 10 can be identified by a unique set of row/column (x,y) coordinates which pinpoint the location of the associated string elements 14 inside the matrix 10. As an example, the credit card number 481 213 537 is constructed from the strings "481", "213" and "537" which are identified by the row and column assignments (R0, C0); (R1, C1); and, (R2, C2), respectively.

In the mapping algorithm employed in the present invention to store and locate credit status information for each credit card, a mask number is formed from the consecutive ordering of the row number components of the X-Y matrix 10 for a particular credit card. For the example credit card number 481 213 537, the row number components for the consecutive strings are (R0, R1, R2), and the mask number in this case is (012). This mask number identifies a particular mask matrix that is derived from the original X-Y matrix 10. Each mask matrix contains all possible permutations of the multiple bit strings defined by the mask number. The mask identified by the mask number (012) corresponding to the X-Y matrix 10 of FIG. 1, is illustrated in FIG. 2. More particularly, FIG. 2 illustrates a mask matrix 20 having a plurality of cells 22, each of which contain a credit card number formed from a combination of three multiple digit strings 24 selected from the X-Y matrix 10 of FIG. 1. Each of the cells 22 is uniquely identified by a row and column number as illustrated. The cell address identified by the row and column number for a particular credit card number is obtained by inserting the column numbers of the X-Y matrix 10 of FIG. 1 for each of the strings that make up the credit card number into the following equation:

$$\text{mask row number} = 3(C0) + C1 \quad (1)$$

$$\text{mask column number} = C2 \quad (2)$$

For the example credit card number 481 213 537, $C0=0$, $C1=1$ and $C2=2$. Therefore, the mask matrix row number is equal to 1 and the mask matrix column number is equal to 2 so that the credit card number 481 213 537 is located in cell (1,2) of the mask matrix 20 as indicated in FIG. 2.

It will be understood that the examples illustrated in FIGS. 1 and 2 are provided for illustration only, and any size matrices can be employed with the present invention as desired, along with multiple digit strings of any size and combination. In general, however, the following statements hold true for the composition of a credit card number generated from string elements X1, X2, ... Xn, belonging to an X-Y matrix of (a) number of rows and (b) number of columns. If a credit card number is composed of (n) number of strings, a total of (a) masks can be generated, each of which is set into a matrix consisting of $(b)^{n-1}$ rows, with (b) elements per row. The sequential numbering of the X-Y matrix row number components associated the multiple digit strings X1, X2, ... Xn forms the mask number. The credit card number to mask cell assignment is determined by the following formula, where C1, C2 ... Cn are the column numbers in the X-Y matrix associated with the strings X1, X2 ... Xn:

$$Mr = \Sigma (b)^{n-j} \times Ci \quad (3)$$
$$\text{Row assigned in mask matrix} = i = 1 \text{ to } (n-1)$$
$$j = 2 \text{ to } n$$

$$\text{Column assigned in mask matrix} = Mc = Cn. \quad (4)$$

The total possible credit card permutations is equal to $(ab)^n$, while the total number of masks generated is equal to $a^n$. The set of credit card numbers associated with a single mask is equal to the total possible permutations divided by the total number of masks generated or $b^n$.

The array size of the X-Y matrix (a and b values) ultimately defines the size and quantity of the mask generated from it. Since this growth is exponential, is very important that these values be carefully chosen. Since mask size (number of cells) is defined as $b^n$, choosing too large a value for "b" will result in mask files which require the transfer of large blocks of data to update. Likewise, choosing too large a value for "a" will generate an unnecessarily excessive number of masks to maintain since that number is $a^n$.

As an example, if an X-Y matrix having 16 rows and 8 columns is selected, and each credit card number is divided into 5 multiple digit strings, then the total number of possible credit card permutations is equal to $(ab)^n = (128)^5 = 34,359,738,378$. The total number of masks generated is equal to $a^n 16^5 = 1,048,576$, and the number of credit card numbers associated with a single mask is equal to 32,768.

The physical structure of the mask matrices derived from the X-Y matrix is incorporated into a software random data file, where the row components correspond to individual file records and the column components correspond to the record length as expressed in bits. In the above example, the record length is one byte (8 bits) and there are 4096 records. In the credit verification system of the present invention, a multitude of these software random files is stored onto an appropriate archive storage medium, such as a CD-ROM disk or hard disk. The mask file is referenced and the appropriate record retrieved into a RAM area. A software "template" is then placed over the record in RAM to determine the binary status of the digital bit associated with the selected credit card number.

Figure 3:
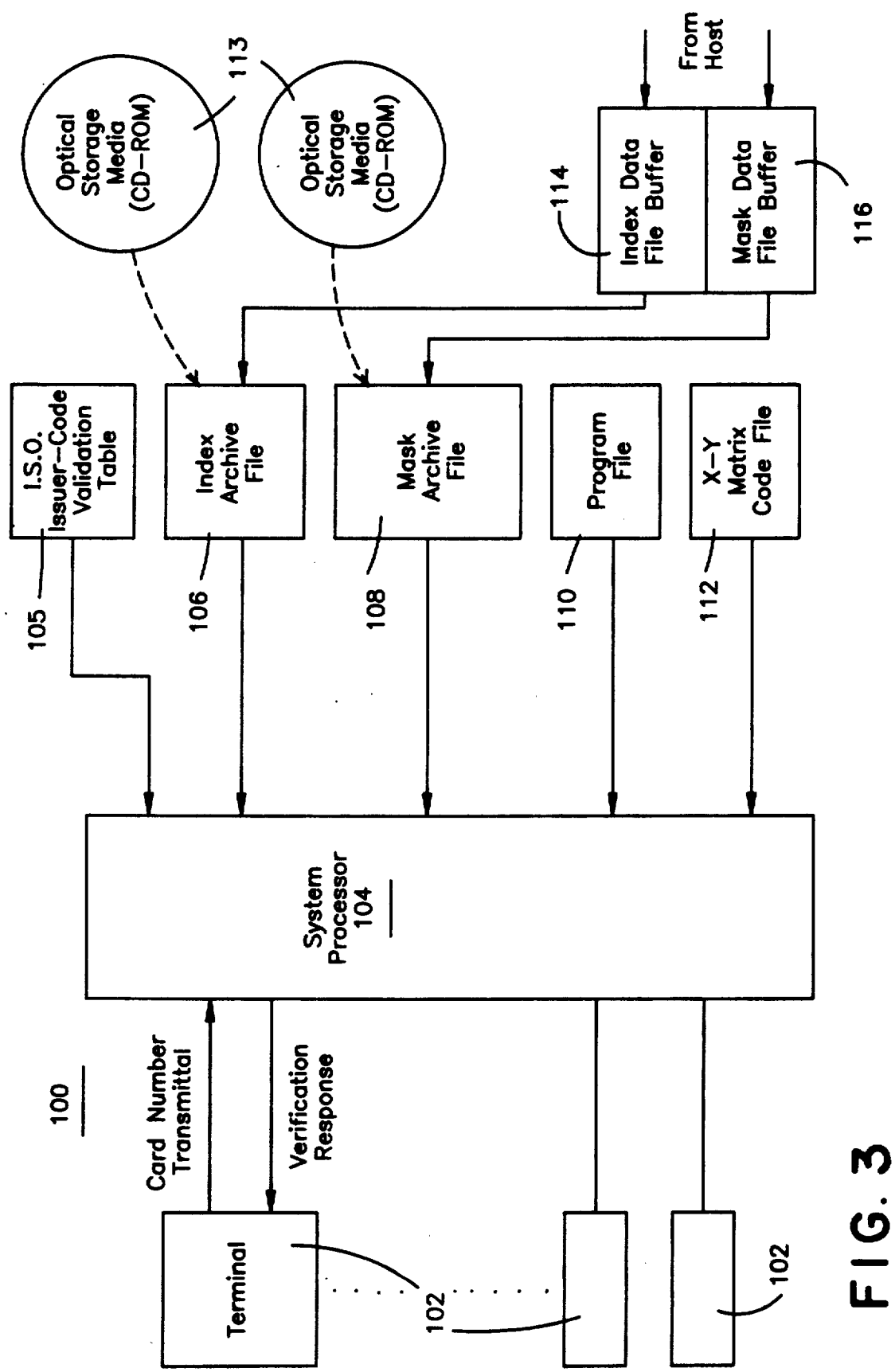
FIG. 3 is a block diagram of a retail system employed in a preferred embodiment of the credit verification system.

The above described process for composing sequences of credit card numbers and then mapping them to cellular locations within an associated matrix for purposes of credit verification is reduced to practice in a program controlled computer process. FIG. 3 illustrates the block diagram of a user network configuration 100 for a preferred embodiment of the credit verifying system. The network 100 includes a plurality of read only verifying terminals 102 for entry of credit card numbers and display of credit status data. Each of the terminals 102 is interfaced to a conventional system processor or file server 104. Also interfacing with the system processor 104 are an issuer code validation table file 105; an index archive file 106; a mask archive file 108; a program file 110; and, an X-Y matrix code file 112.

The issuer code validation table file 105 contains a list of valid issuer codes which all banks employ and are established by the International Standards Organization Technical Committee (ISO TC). These codes are typically formed of the first 4 digits of a credit card number.

The index archive file 106 contains status information on all valid mask numbers. Each bit in the index archive file 106 represents status indication for an entire mask file, which represents thousands of card numbers. The index file is used to indicate which mask files are currently active and which are not. Thus, it is not necessary to establish the full complement of mask files in the system. The index file also serves as a second level of screening against fictitious card numbers which are associated with inactive masks. A separate index file is established for each ISO issuer code and is a strategic tool used by the system planner to either add or delete large blocks of card numbers as required. This is done by setting the appropriate bit in the index file matrix to the corresponding binary level.

The mask archive file 108 contains the actual credit card status data arranged in accordance with the mask matrices corresponding to each of the mask numbers. The program file 110 contains the program for executing the credit card number mapping algorithm described above. During execution, the program accesses the X-Y matrix code files 112 so that a credit card number can be broken down into its corresponding multiple digit consecutive strings, and the strings employed to determine the mask number.

The issuer code validation table file 105, index archive file 106 and mask archive file 108 can be stored on any suitable compact storage media, such as CD-ROM disks or magnetic tape as indicated at 113, which can be replaced with new disks or tapes containing periodically updated credit card status information. The standard CD-ROM disk can illustrate the storage density of credit card verification status indicators. A standard CD-ROM provides approximately 600 megabytes of storage. In the basic scheme of the present invention where card status indicators are a single bit, one CD- ROM disk can accommodate 600,000,000×8, or 4.8 billion credit cards (not counting reserved and administrative storage space). Such a huge potential is appreciated when one realizes that 4.8 billion credit cards are many times over the quantity in circulation today. Alternatively, updated information can be downloaded from an index data file buffer 114 and a mask data file buffer 116, both of which receive updated information from a host or credit agency via a conventional data link.

Figure 4:
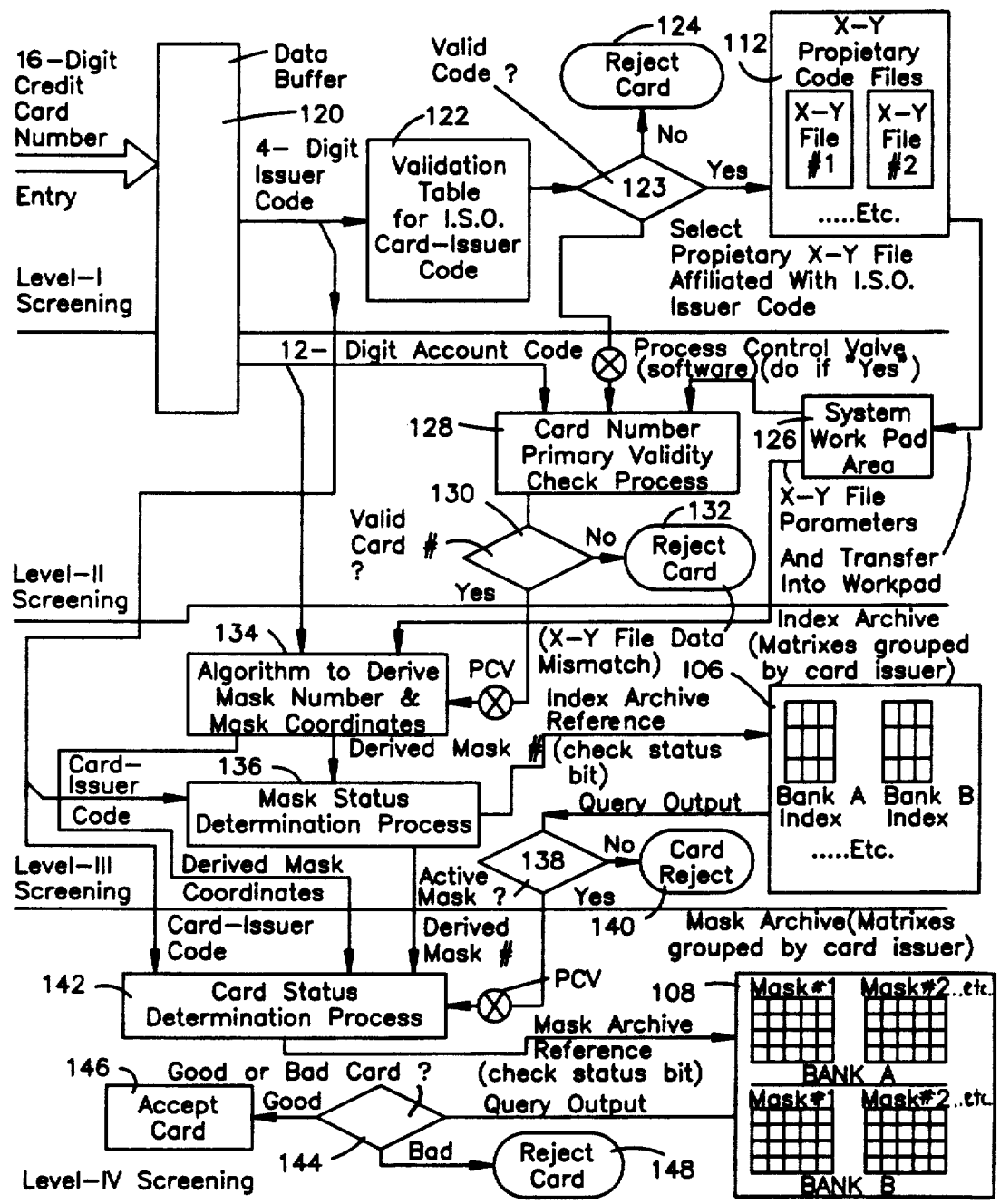
FIG. 4 is a software control flow chart of the preferred embodiment of the invention which is employed with the retail system.

The operation of the credit card status verifying process is illustrated in the flow chart of FIG. 4. An example program written in BASIC for implementing the credit card status verifying process is set forth in appendix 1 attached to the end of this description.

Before the credit verifying process is implemented, the application program must be loaded from the program file 110 into the main processor contained within the system processor 104. A credit card number is then entered via one of the verification terminals 102 into a data buffer 120 contained within the system processor 104 as illustrated in FIG. 4. For example purposes only, the credit card number is chosen to contain 16 digits. As discussed previously, the first 4 digits of the credit card correspond to the issuer code A validation table 122 containing all valid ISO card issuer codes is contained within the issuer code table file 105, and is employed to check if the issuer code of the credit card is valid as indicated by box 123. If the issuer code is not valid, the credit card number is immediately rejected as indicated at 124 in the flow chart, and the system processor 104 outputs an indication to the verification terminal 102 that the credit card number is invalid. This constitutes a first level of screening in the process.

If the issuer code is determined to be valid, it is employed during a second level of screening to select a corresponding X-Y matrix file from the X-Y matrix code files 112 and transfer that file into a system work pad area 126 contained within the file server 104. Thus, a different X-Y matrix can be provided for each issuer code as necessary to accommodate any number of issuing banks and their associated credit cards.

The remaining 12 digits of the credit card correspond to its account code and are broken down into multiple digit strings and compared to the strings in the selected X-Y matrix contained within the work pad area 126 as indicated by box 128 of the flow chart. If a match is not found for each of the strings in the X-Y matrix, the credit card number is determined to be invalid and rejected as indicated at boxes 130 and 132. Once again, the system processor 104 will output an indication to the verification terminal 102 that the entered credit card number is invalid if this occurs. If, on the other hand, a match is found for each of the strings, the card number is found to be valid thus initiating the operation of the algorithm to derive the mask number and mask coordinates from the row and column numbers of the strings as indicated at box 134.

The status of the derived mask number is next determined in a third level of screening as indicated at box 136 by employing the card issuer code to select a corresponding index file from the index archive file 106 and check a status bit of the file to determine if the mask number is active as indicated at box 138. If the mask number is not active, the system processor 104 will output an indication that the credit card number is rejected to the verification terminal 102 as indicated at box 140. If the derived mask number is determined to be active, a card status determination process is initiated as indicated at box 142.

During a fourth and final level of screening, the mask archive file 108 is accessed, and the mask file corresponding to the derived mask number and card issuer code is checked. The derived mask row and column numbers are employed using equations (3) and (4) to locate the cell within the selected mask file containing the status information for the particular credit card number. The cell can contain one or more bits of status information, and in its simplest form, contains either a "1" or a "0" to indicate a good or a bad card. If two status bits are provided for each card number, then information regarding credit limit can also be denoted by the bits. For example, "00" can indicate a bad card, "01" can indicate a $500 credit limit, "10" can indicate a $1000 limit and "11" can indicate a $1500 limit. In this case, a purchase amount can also be entered with the credit card number and compared to the credit limit to determine not only if the card is valid, but also if the card has a high enough credit limit for the desired purchase. The status of the credit card is therefore checked from the status bits as indicated at box 144, and an indication of acceptance or rejection is outputted to the verification terminal 102 as indicated at boxes 146 and 148 depending on the determined status.

In the foregoing manner, the credit status of a very large number of credit cards can be stored and accessed with a relatively small amount of memory space so that a compact storage media, such as a CD-ROM disk can be utilized for this purpose. As a result, the present invention enables a remote location to store all of the credit card status information thereby eliminating any reliance on a central computer facility and any data links connected thereto. In addition, the mapping algorithm and multiple level screening process employed in the present invention provides a quick and economical process for verifying credit status of a credit card.

The network configuration for the host credit agency which provides the status information for the various files would be configured virtually identical to the network configuration illustrated in FIG. 3 with the exception that the verification terminals 102 and system processor 104 would have the added capability of making changes to the various status bits and files as new credit cards are issued, old credit cards are invalidated and credit status of active cards is changed. Sample programs written in BASIC which are employed by the credit agency to create the various files and change the credit status of credit cards are attached hereto as appendices 2-6. In particular, appendix 2 is a program for establishing the X-Y matrix file and the issuer code table. Appendices 3, 4 and 5 are utility programs which establish the index and mask files, print reports of active masks, activate issued cards, deactivate recalled cards and provide credit card status reports. Finally, appendix 6 is a program for upgrading or downgrading the status of a credit card.

Although the present invention has been disclosed in terms of a preferred embodiment, it will be understood that numerous modifications and variations could be made thereto without departing from the true spirit and scope of the invention as defined in the following claims.

APPENDIX 1

```
10 CLS
20 DATA 1,2,4,8,16,32,64,128
30 DIM T(7),V(15),V$(15),GRP(4)
40 FOR I=0 TO 7
50 READ T(I):NEXT I
60 PRINT:PRINT
70 PRINT "            ICVS/QUANTUM INSTANT VERIFICATION SYSTEM":PRINT
80 PRINT "                     RELEASE 1.0":PRINT
90 PRINT "               COPYRIGHT 1990 QUANTUM SYSTEMS":PRINT:PRINT:PRINT
100 PRINT "ENTER CREDIT CARD# > ";
110 FOR I=0 TO 15
120 V$(I)=INPUT$(1)
130 IF V$(I)="" THEN GOTO 120
140 PRINT V$(I);
150 IF (I=3) OR (I=6) OR (I=9) OR (I=12) THEN PRINT " ";
160 NEXT I
170 PRINT
180 FOR I=0 TO 15
190 IF V$(I)="0" THEN V(I)=0:GOTO 310
200 IF V$(I)="1" THEN V(I)=1:GOTO 310
210 IF V$(I)="2" THEN V(I)=2:GOTO 310
220 IF V$(I)="3" THEN V(I)=3:GOTO 310
230 IF V$(I)="4" THEN V(I)=4:GOTO 310
240 IF V$(I)="5" THEN V(I)=5:GOTO 310
250 IF V$(I)="6" THEN V(I)=6:GOTO 310
260 IF V$(I)="7" THEN V(I)=7:GOTO 310
270 IF V$(I)="8" THEN V(I)=8:GOTO 310
280 IF V$(I)="9" THEN V(I)=9:GOTO 310
290 PRINT:PRINT "INVALID ENTRY . . . ENTER AGAIN":BEEP:BEEP
300 FOR J=1 TO 1000:NEXT J:CLS:GOTO 60
310 NEXT I
320 GRP(0)=V(1)*100+V(2)*10+V(3)
330 GRP(1)=V(4)*100+V(5)*10+V(6)
340 GRP(2)=V(7)*100+V(8)*10+V(9)
350 GRP(3)=V(10)*100+V(11)*10+V(12)
360 GRP(4)=V(13)*100+V(14)*10+V(15)
370 PRINT:PRINT:PRINT "PROCESSING ... PLEASE WAIT":PRINT
380 ISSCODE$=V$(0)+V$(1)+V$(2)+V$(3)
390 IF V(0)=4 THEN ISOCODE$="ISOTC4": GOTO 420
400 IF V(0)=5 THEN ISOCODE$="ISOTC5": GOTO 420
410 PRINT "INVALID CARD NUMBER . . .":BEEP:GOTO 740
420 OPEN "A:\PRIMARY\"+ISOCODE$ AS #1 LEN=2
430 FIELD #1, 2 AS IX$
440 GET #1, GRP(0)+1
450 ST=CVI(IX$):CLOSE
460 IF ST=0 THEN PRINT "INVALID CARD NUMBER . . .":BEEP:GOTO 740
470 IF ST=1 THEN XFILE$="TABL1"
480 IF ST=2 THEN XFILE$="TABL2"
490 OPEN "A:\XYMT\"+XFILE$ AS #1 LEN=4
500 FIELD #1, 2 AS IX$, 2 AS KX$
510 GET #1, GRP(1)+1:R1=CVI(IX$):C1=CVI(KX$)
520 GET #1, GRP(2)+1:R2=CVI(IX$):C2=CVI(KX$)
530 GET #1, GRP(3)+1:R3=CVI(IX$):C3=CVI(KX$)
540 GET #1, GRP(4)+1:R4=CVI(IX$):C4=CVI(KX$)
550 CLOSE
560 IF (R1=77) OR (R2=77) OR (R3=77) OR (R4=77) THEN PRINT "INVALID CARD NUMBER
 . . . ":BEEP: GOTO 740
570 MASK=(R1*4096)+(R2*256)+(R3*16)+R4
580 MASKNAME$=HEX$(R1)+HEX$(R2)+HEX$(R3)+HEX$(R4)
590 IREC=INT(MASK/8):JREC=MASK-IREC*8
600 OPEN "A:\INDEX\"+ISSCODE$ AS #1 LEN=2
610 FIELD #1, 2 AS IX$
620 GET #1, IREC+1
630 ST=CVI(IX$):CLOSE
640 ST=ST AND T(JREC)
650 IF ST=0 THEN PRINT "INVALID CARD NUMBER . . .":BEEP:GOTO 740
660 REC=(C1*64)+(C2*8)+C3
670 OPEN "A:\MASK\"+ISSCODE$+"\"+MASKNAME$ AS #1 LEN=2
```

```
680 FIELD #1, 2 AS IX$
690 GET #1, REC+1
700 ST=CVI(IX$):CLOSE
710 ST=ST AND T(C4)
720 IF ST=0 THEN PRINT "BAD CARD . . . DO NOT ACCEPT":BEEP:GOTO 740
730 PRINT "CREDIT O.K."
740 PRINT:PRINT:PRINT:PRINT "    . . . PRESS <RET> TO CONTINUE":BEEP
750 K$=INPUT$(1)
760 IF K$="" THEN GOTO 750
770 CLS:GOTO 60
```

APPENDIX 2

```
10 CLS
20 PRINT "INITIALIZING ROUTINE ...":PRINT
30 PRINT "1.  ESTABLISH PROPRIETARY X-Y MATRIX TABLES"
40 PRINT "2.  INITIALIZE PRIMARY ISO-TC4 TABLE"
50 PRINT "3.  ACTIVATE ISSUER PER ISO-TC4 TABLE"
60 PRINT "4.  CHECK STATUS ON ISO-TC4 TABLE"
70 PRINT:INPUT "SELECT ONE  >  ",A$
80 IF A$="1" THEN GOTO 110
90 IF A$="2" THEN GOTO 960
100 IF A$="3" THEN GOTO 1050
105 IF A$="4" THEN GOTO 1120
106 GOTO 70
110 CLS
120 PRINT "ESTABLISHING PROPRIETARY CODE TABLE":PRINT
130 DIM A$(15,7),B(999),C(999)
140 DATA TABL1,CODE1
150 DATA 000,001,002,003,004,005,006,007
160 DATA 101,102,103,104,105,106,107,108
170 DATA 201,202,203,204,205,206,207,208
180 DATA 301,302,303,304,305,306,307,308
190 DATA 401,402,403,404,405,406,407,408
200 DATA 501,502,503,504,505,506,507,508
210 DATA 601,602,603,604,605,606,607,608
220 DATA 701,702,703,704,705,706,707,708
230 DATA 801,802,803,804,805,806,807,808
240 DATA 901,902,903,904,905,906,907,908
250 DATA 161,162,163,164,165,166,167,168
260 DATA 251,252,253,254,255,256,257,258
270 DATA 341,342,343,344,345,346,347,348
280 DATA 431,432,433,434,435,436,437,438
290 DATA 521,522,523,524,525,526,527,528
300 DATA 611,612,613,614,615,616,617,618
310 DATA TABL2,CODE2
320 DATA 000,001,002,003,004,005,006,007
330 DATA 101,102,103,104,105,106,107,108
340 DATA 201,202,203,204,205,206,207,208
350 DATA 301,302,303,304,305,306,307,308
360 DATA 401,402,403,404,405,406,407,408
370 DATA 501,502,503,504,505,506,507,508
380 DATA 601,602,603,604,605,606,607,608
390 DATA 701,702,703,704,705,706,707,708
400 DATA 801,802,803,804,805,806,807,808
410 DATA 900,901,902,903,904,905,906,907
420 DATA 191,192,193,194,195,196,197,198
430 DATA 281,282,283,284,285,286,287,288
440 DATA 371,372,373,374,375,376,377,378
450 DATA 461,462,463,464,465,466,467,468
460 DATA 551,552,553,554,555,556,557,558
470 DATA 641,642,643,644,645,646,647,648
480 FOR S=1 TO 2
490 READ XY$,CODE$
500 FOR I=0 TO 15
510  FOR J=0 TO 7
520 READ A$(I,J)
530 NEXT J:NEXT I
```

```
540 N=1
550 OPEN "A:\XYMT\"+CODE$ AS #1 LEN=3
560 FIELD #1, 3 AS IX$
570 FOR I=0 TO 15:FOR J=0 TO 7
580 LSET IX$ =A$(I,J)
590 PUT #1, N:N=N+1
600 NEXT J:NEXT I
610 PRINT " THIS IS THE MATRIX CODE TABLE":PRINT
620 N=1
630 FOR I=0 TO 15
640 FOR J=0 TO 7
650 GET #1, N
660 PRINT IX$;",";:N=N+1
670 NEXT J:PRINT
680 NEXT I:CLOSE
690 FOR I=0 TO 999
700 B(I)=77:C(I)=77:NEXT I
710 FOR I=0 TO 15
720 FOR J=0 TO 7
730 B(VAL(A$(I,J)))=I:C(VAL(A$(I,J)))=J
740 NEXT J:NEXT I
750 OPEN "A:\XYMT\"+XY$ AS #1 LEN=4
760 FIELD #1, 2 AS IX$, 2 AS KX$
770 FOR I=0 TO 999
780 LSET IX$=MKI$(B(I))
790 LSET KX$=MKI$(C(I))
800 PUT #1, I+1
810 NEXT I
820 PRINT:PRINT "THIS IS THE X-Y VALIDATION TABLE":PRINT
830 N=1
840 FOR I=1 TO 250
850 FOR J=1 TO 4
860 GET #1, N
870 ST=CVI(IX$):SX=CVI(KX$)
880 PRINT N-1;"B=";ST;"C=";SX;" ";
890 N=N+1
900 NEXT J
910 PRINT
920 NEXT I:CLOSE
930 NEXT S
940 PRINT "PROCESS COMPLETED . . . "
950 GOTO 10
960 CLS
970 PRINT "INITIALIZING PRIMARY ISOTC-4 ... PLEASE STANDBY"
980 OPEN "A:\PRIMARY\ISOTC4" AS #1 LEN=2
990 FIELD #1, 2 AS IX$
1000 FOR I=1 TO 1000
1010 LSET IX$=MKI$(0)
1020 PUT #1, I
1030 NEXT I:CLOSE
1040 GOTO 10
1050 CLS
1060 INPUT "SPECIFY ISSUER CODE FOR ISOTC-4 TO SET (ARRAY 1) > ",ID
1070 OPEN "A:\PRIMARY\ISOTC4" AS #1 LEN=2
1080 FIELD #1, 2 AS IX$
1090 LSET IX$=MKI$(1)
1100 PUT #1, ID+1
1110 CLOSE:GOTO 10
1120 CLS
1130 PRINT "STATUS CHECK FOR PRIMARY ISO-TC4":PRINT
1140 OPEN "A:\PRIMARY\ISOTC4" AS #1 LEN=2
1150 FOR I=1 TO 1000
1160 FIELD #1, 2 AS IX$
1170 GET #1, I
1180 ST=CVI(IX$):PRINT "4";(I-1);"     ";ST
1190 NEXT I:CLOSE:GOTO 10
```

APPENDIX 3

```
10 DATA 254,253,251,247,239,223,191,127,1,2,4,8,16,32,64,128
```

```
20 DIM V$(15),V(15),T(7,1),M(8191)
30 FOR I=0 TO 7:READ T(I,0):NEXT I
40 FOR I=0 TO 7:READ T(I,1):NEXT I
50 CLS:PRINT
60 PRINT "ICVS/QUANTUM UTILITIES (COPYRIGHT 1990 QUANTUM SYSTEMS)":PRINT
65 PRINT "(NOTE: INSERT ARCHIVE DISK PRIOR TO SELECTION OF 1 THRU 4 ONLY)"
67 PRINT
70 PRINT "   1. CREATE AND INITIALIZE INDEX"
80 PRINT "   2. CREATE AND INITIALIZE MASK"
90 PRINT "   3. MODIFY INDEX (ADD/DELETE MASKS)"
100 PRINT "   4. PRINT ACTIVE MASKS"
110 PRINT "   5. PRINT CARD STATUS FOR A GIVEN MASK"
115 PRINT "   6. ACTIVATE OR DEACTIVATE CARD "
120 PRINT:INPUT "SELECT MODE > ",A$
130 IF A$="1" THEN GOTO 190
140 IF A$="2" THEN GOTO 310
150 IF A$="3" THEN GOTO 430
160 IF A$="4" THEN GOTO 970
170 IF A$="5" THEN RUN "A:CARDSTAT
175 IF A$="6" THEN RUN "A:CARDACT
180 GOTO 120
190 CLS:PRINT
200 INPUT "ENTER PRIMARY ID >",ID$
210 PRINT:PRINT "INITIALIZING INDEX .... PLEASE STANDBY"
220 OPEN "A:\INDEX\"+ID$ AS #1 LEN=2
230 FIELD #1, 2 AS IX$
240 FOR I=1 TO 8192
250 LSET IX$=MKI$(0)
260 PUT #1, I
270 NEXT I:CLOSE
280 PRINT:PRINT "INITIALIZATION COMPLETE ... PRESS ANY KEY"
290 K$=INPUT$(1):IF K$="" THEN THEN GOTO 290
300 GOTO 50
310 CLS:PRINT
320 INPUT "ENTER PRIMARY ID >",ID$
330 PRINT:INPUT "ENTER MASK NAME > ",M$
340 PRINT:PRINT "INITIALIZING MASK ";M$;" .... PLEASE STANDBY"
350 OPEN "A:\MASK\"+ID$+"\"+M$ AS #1 LEN=2
360 FIELD #1, 2 AS IX$
365 OPEN "A:\UNMASK\"+ID$+"\"+M$ AS #2 LEN=2
366 FIELD #2, 2 AS KX$
370 FOR I=1 TO 512
380 LSET IX$=MKI$(0)
390 PUT #1, I
395 LSET KX$=MKI$(0)
396 PUT #2, I
397 NEXT I:CLOSE 1:CLOSE 2
400 PRINT:PRINT "INITIALIZATION COMPLETE ... PRESS ANY KEY"
410 K$=INPUT$(1):IF K$="" THEN THEN GOTO 410
420 GOTO 50
430 CLS:PRINT
440 PRINT "         INDEX MODIFICATION":PRINT
450 PRINT "           1. ACTIVATE MASK"
460 PRINT "           2. DE-ACTIVATE MASK":PRINT
470 INPUT "         SELECT MODE > ",A$
480 IF A$="1" THEN A=0:GOTO 510
490 IF A$="2" THEN A=1:GOTO 510
500 GOTO 470
510 PRINT:INPUT "ENTER PRIMARY ID > ",ID$
520 PRINT:PRINT "ENTER MASK NAME > ";
530 FOR I=0 TO 3
540 V$(I)=INPUT$(1)
550 IF V$(I)="" THEN GOTO 540
560 PRINT V$(I);:NEXT I
570 FOR I=0 TO 3
580 IF V$(I)="0" THEN V(I)=0:GOTO 760
590 IF V$(I)="1" THEN V(I)=1:GOTO 760
600 IF V$(I)="2" THEN V(I)=2:GOTO 760
610 IF V$(I)="3" THEN V(I)=3:GOTO 760
620 IF V$(I)="4" THEN V(I)=4:GOTO 760
630 IF V$(I)="5" THEN V(I)=5:GOTO 760
640 IF V$(I)="6" THEN V(I)=6:GOTO 760
650 IF V$(I)="7" THEN V(I)=7:GOTO 760
```

```
660 IF V$(I)="8" THEN V(I)=8:GOTO 760
670 IF V$(I)="9" THEN V(I)=9:GOTO 760
680 IF V$(I)="A" THEN V(I)=10:GOTO 760
690 IF V$(I)="B" THEN V(I)=11:GOTO 760
700 IF V$(I)="C" THEN V(I)=12:GOTO 760
710 IF V$(I)="D" THEN V(I)=13:GOTO 760
720 IF V$(I)="E" THEN V(I)=14:GOTO 760
730 IF V$(I)="F" THEN V(I)=15:GOTO 760
740 PRINT:PRINT "INVALID MASK NAME ... TRY AGAIN"
750 FOR J=1 TO 1000:NEXT J:GOTO 430
760 NEXT I
770 MASK=V(0)*4096+V(1)*256+V(2)*16+V(3)
775 MASKNAME$=HEX$(V(0))+HEX$(V(1))+HEX$(V(2))+HEX$(V(3))
780 IREC=INT(MASK/8)
790 JREC=MASK-IREC*8
800 OPEN "A:\INDEX\"+ID$ AS #1 LEN=2
810 FIELD #1, 2 AS IX$
820 GET #1, IREC+1:X=CVI(IX$)
830 IF A=1 THEN X=X AND T(JREC,0)
840 IF A=0 THEN X=X OR T(JREC,1)
850 LSET IX$=MKI$(X)
860 PUT #1, IREC+1:CLOSE
870 OPEN "A:\INDEX\"+ID$ AS #1 LEN=2
880 FIELD #1, 2 AS IX$
890 GET #1, IREC+1
900 X=CVI(IX$):CLOSE
910 X=X AND T(JREC,1)
920 IF X=0 THEN PRINT "   :.. MASK ";MASKNAME$;" IS NOW DEACTIVATED":GOTO 940
930 PRINT "    ... MASK ";MASKNAME$;" IS NOW ACTIVATED"
940 PRINT:PRINT:PRINT " .... PRESS ANY KEY TO RETURN"
950 K$=INPUT$(1):IF K$="" THEN 950
960 GOTO 50
970 CLS:PRINT:PRINT
980 INPUT "ENTER PRIMARY ID > ",ID$
990 PRINT:PRINT "PROCESSING ACTIVE MASKS FOR P.I.D. > ";ID$;"  PLEASE STANDBY .."
1000 OPEN "A:\INDEX\"+ID$ AS #1 LEN=2
1010 FIELD #1, 2 AS IX$
1020 FOR I=0 TO 8191
1030 GET #1, I+1:M(I)=CVI(IX$)
1040 NEXT I:CLOSE
1050 FOR I=0 TO 8191
1060 IF M(I)=0 THEN GOTO 1110
1070 FOR K=0 TO 7
1080 IF (M(I) AND T(K,1))=0 THEN GOTO 1100
1090 PRINT HEX$(I*8+K)
1100 NEXT K
1110 NEXT I
1120 PRINT:PRINT "PRESS ANY KEY TO RETURN"
1130 K$=INPUT$(1):IF K$="" THEN GOTO 1130
1140 GOTO 50
```

APPENDIX 4

```
10 CLS
20 DATA 254,253,251,247,239,223,191,127,1,2,4,8,16,32,64,128
30 DIM T(7,1),V(15),V$(15),GRP(4)
40 FOR I=0 TO 7
50 READ T(I,0):NEXT I
60 FOR I=0 TO 7
70 READ T(I,1):NEXT I
80 PRINT:PRINT
90 PRINT "             ICVS/QUANTUM INSTANT VERIFICATION SYSTEM":PRINT
100 PRINT "                      RELEASE 1.0":PRINT
110 PRINT "                COPYRIGHT 1990 QUANTUM SYSTEMS":PRINT:PRINT:PRINT

120 PRINT "             1. DEACTIVATE CARD"
130 PRINT "             2. ACTIVATE CARD"
140 PRINT:INPUT "SELECT MODE > ",A$
```

```
150 IF A$="1" THEN A=0:GOTO 180
160 IF A$="2" THEN A=1:GOTO 180
170 GOTO 140
180 PRINT:PRINT "ENTER CREDIT CARD# > ";
190 FOR I=0 TO 15
200 V$(I)=INPUT$(1)
210 IF V$(I)="" THEN GOTO 200
220 PRINT V$(I);
230 IF (I=3) OR (I=6) OR (I=9) OR (I=12) THEN PRINT " ";
240 NEXT I
250 PRINT
260 FOR I=0 TO 15
270 IF V$(I)="0" THEN V(I)=0:GOTO 390
280 IF V$(I)="1" THEN V(I)=1:GOTO 390
290 IF V$(I)="2" THEN V(I)=2:GOTO 390
300 IF V$(I)="3" THEN V(I)=3:GOTO 390
310 IF V$(I)="4" THEN V(I)=4:GOTO 390
320 IF V$(I)="5" THEN V(I)=5:GOTO 390
330 IF V$(I)="6" THEN V(I)=6:GOTO 390
340 IF V$(I)="7" THEN V(I)=7:GOTO 390
350 IF V$(I)="8" THEN V(I)=8:GOTO 390
360 IF V$(I)="9" THEN V(I)=9:GOTO 390
370 PRINT:PRINT "INVALID ENTRY . . . ENTER AGAIN":BEEP:BEEP
380 FOR J=1 TO 1000:NEXT J:CLS:GOTO 80
390 NEXT I
400 GRP(0)=V(1)*100+V(2)*10+V(3)
410 GRP(1)=V(4)*100+V(5)*10+V(6)
420 GRP(2)=V(7)*100+V(8)*10+V(9)
430 GRP(3)=V(10)*100+V(11)*10+V(12)
440 GRP(4)=V(13)*100+V(14)*10+V(15)
450 PRINT:PRINT:PRINT "PROCESSING ... PLEASE WAIT":PRINT
460 ISSCODE$=V$(0)+V$(1)+V$(2)+V$(3)
470 IF V(0)=4 THEN ISOCODE$="ISOTC4": GOTO 500
480 IF V(0)=5 THEN ISOCODE$="ISOTC5": GOTO 500
490 PRINT "INVALID CARD NUMBER . . .":BEEP:GOTO 970
500 OPEN "A:\PRIMARY\"+ISOCODE$ AS #1 LEN=2
510 FIELD #1, 2 AS IX$
520 GET #1, GRP(0)+1
530 ST=CVI(IX$):CLOSE
540 IF ST=0 THEN PRINT "INVALID CARD NUMBER . . .":BEEP:GOTO 970
550 IF ST=1 THEN XFILE$="TABL1"
560 IF ST=2 THEN XFILE$="TABL2"
570 OPEN "A:\XYMT\"+XFILE$ AS #1 LEN=4
580 FIELD #1, 2 AS IX$, 2 AS KX$
590 GET #1, GRP(1)+1:R1=CVI(IX$):C1=CVI(KX$)
600 GET #1, GRP(2)+1:R2=CVI(IX$):C2=CVI(KX$)
610 GET #1, GRP(3)+1:R3=CVI(IX$):C3=CVI(KX$)
620 GET #1, GRP(4)+1:R4=CVI(IX$):C4=CVI(KX$)
630 CLOSE
640 IF (R1=77) OR (R2=77) OR (R3=77) OR (R4=77) THEN PRINT "INVALID CARD NUMBER
 . . .":BEEP: GOTO 970
650 MASK=(R1*4096)+(R2*256)+(R3*16)+R4
660 MASKNAME$=HEX$(R1)+HEX$(R2)+HEX$(R3)+HEX$(R4)
670 IREC=INT(MASK/8):JREC=MASK-IREC*8
680 OPEN "A:\INDEX\"+ISSCODE$ AS #1 LEN=2
690 FIELD #1, 2 AS IX$
700 GET #1, IREC+1
710 ST=CVI(IX$):CLOSE
720 ST=ST AND T(JREC,1)
730 IF ST=0 THEN PRINT "INVALID CARD NUMBER . . .":BEEP:GOTO 970
740 REC=(C1*64)+(C2*8)+C3
750 OPEN "A:\UNMASK\"+ISSCODE$+"\"+MASKNAME$ AS #1 LEN=2
760 FIELD #1, 2 AS IX$
770 GET #1, REC+1
780 ST=CVI(IX$):PS=ST AND T(C4,1)
790 IF A=0 THEN ST=ST AND T(C4,A)
800 IF A=1 THEN ST=ST OR T(C4,A)
810 LSET IX$=MKI$(ST)
820 PUT #1, REC+1:CLOSE
830 OPEN "A:\UNMASK\"+ISSCODE$+"\"+MASKNAME$ AS #1 LEN=2
840 FIELD #1, 2 AS IX$
850 GET #1, REC+1
860 NS=CVI(IX$):CLOSE
```

```
870 IF PS=0 THEN PS$="UNISSUED" ELSE PS$="ISSUED"
880 IF (NS AND T(C4,1))=0 THEN NS$="UNISSUED" ELSE NS$="ISSUED"
890 PRINT "PREVIOUS STATUS = ";PS$;"      NEW STATUS = ";NS$:PRINT
900 CCN$=V$(0)
910 FOR I=1 TO 15
920 CCN$=CCN$+V$(I)
930 IF (I=3) OR (I=6) OR (I=9) OR (I=12) THEN CCN$=CCN$+" "
940 NEXT I
950 IF A=0 THEN PRINT "CARD # ";CCN$;"    MASK # ";MASKNAME$;"   DEACTIVATED"
960 IF A=1 THEN PRINT "CARD # ";CCN$;"    MASK # ";MASKNAME$;"   ACTIVATED"
970 BEEP:PRINT:PRINT "  ... PRESS <RET> TO CONTINUE":PRINT
975 PRINT " OR ... INSERT UTILITIES DISK AND PRESS 'Q' TO QUIT"
980 K$=INPUT$(1)
990 IF K$="" THEN GOTO 980
995 IF K$="Q" THEN GOTO 1000
997 CLS:GOTO 80
1000 CLS:RUN "A:UTILS
```

APPENDIX 5

```
10 CLS
20 DATA 1,2,4,8,16,32,64,128
30 DIM A$(15,7),V(4),V$(4),T(7),M(511),Q(511)
40 FOR I=0 TO 7:READ T(I):NEXT I
50 CLS:PRINT:PRINT "CARD STATUS REPORT":PRINT
60 INPUT "ENTER PRIMARY ID > ",ID$
70 PRINT:INPUT "ENTER 'CODE1' OR 'CODE2' > ",XY$
80 PRINT:PRINT "ENTER MASK NAME > ";
90 FOR I=0 TO 3
100 V$(I)=INPUT$(1)
110 IF V$(I)="" THEN GOTO 100
120 PRINT V$(I);:NEXT I:PRINT
130 FOR I=0 TO 3
140 IF V$(I)="0" THEN V(I)=0:GOTO 320
150 IF V$(I)="1" THEN V(I)=1:GOTO 320
160 IF V$(I)="2" THEN V(I)=2:GOTO 320
170 IF V$(I)="3" THEN V(I)=3:GOTO 320
180 IF V$(I)="4" THEN V(I)=4:GOTO 320
190 IF V$(I)="5" THEN V(I)=5:GOTO 320
200 IF V$(I)="6" THEN V(I)=6:GOTO 320
210 IF V$(I)="7" THEN V(I)=7:GOTO 320
220 IF V$(I)="8" THEN V(I)=8:GOTO 320
230 IF V$(I)="9" THEN V(I)=9:GOTO 320
240 IF V$(I)="A" THEN V(I)=10:GOTO 320
250 IF V$(I)="B" THEN V(I)=11:GOTO 320
260 IF V$(I)="C" THEN V(I)=12:GOTO 320
270 IF V$(I)="D" THEN V(I)=13:GOTO 320
280 IF V$(I)="E" THEN V(I)=14:GOTO 320
290 IF V$(I)="F" THEN V(I)=15:GOTO 320
300 PRINT "INVALID CREDIT CARD NUMBER .... TRY AGAIN
310 FOR J=1 TO 1000:NEXT J:BEEP:GOTO 50
320 NEXT I
330 MASKNAME$=V$(0)+V$(1)+V$(2)+V$(3)
340 PRINT:PRINT "PROCESSING ..... PLEASE STANDBY"
350 OPEN "A:\MASK\"+ID$+"\"+MASKNAME$ AS #1 LEN=2
360 FIELD #1, 2 AS IX$
370 OPEN "A:\UNMASK\"+ID$+"\"+MASKNAME$ AS #2 LEN=2
380 FIELD #2, 2 AS KX$
390 FOR I=0 TO 511
400 GET #1, I+1
410 M(I)=CVI(IX$)
420 GET #2, I+1
430 Q(I)=CVI(KX$)
440 NEXT I:CLOSE 1:CLOSE 2
450 PRINT:PRINT "CREDIT CARD NUMBER          STATUS"
460 PRINT "---------------------------------"
470 OPEN "A:\XYMT\"+XY$ AS #1 LEN=3
480 FIELD #1, 3 AS IX$
```

```
490 N=1
500 FOR I=0 TO 15
510 FOR J=0 TO 7
520 GET #1, N
530 A$(I,J)=IX$
540 N=N+1
550 NEXT J:NEXT I
560 M=V(0):N=V(1):O=V(2):P=V(3)
570 FOR I=0 TO 7
580  FOR J=0 TO 7
590   FOR K=0 TO 7
600    LNE=I*64+J*8+K
610    FOR L=0 TO 7
620     PRINT ID$;" ";
630     PRINT A$(M,I);" ";
640     PRINT A$(N,J);" ";
650     PRINT A$(O,K,," ";
660     PRINT A$(P,L);"          ";
670 IF (Q(LNE) AND T(L))=0 THEN PRINT "UNISSUED CARD":GOTO 690
680    IF (M(LNE) AND T(L))=0 THEN PRINT "BAD CARD" ELSE PRINT "GOOD CARD"
690    NEXT L
700   NEXT K
710  NEXT J
720 NEXT I
730 BEEP:BEEP
740 PRINT:PRINT "STATUS REPORT COMPLETE ... "
745 PRINT:PRINT " ... TO CONTINUE, PRESS <ENTER>":PRINT
746 PRINT " OR ... TO QUIT, INSERT UTILITIES DISK AND PRESS  'Q'"
750 K$=INPUT$(1):IF K$="" THEN GOTO 750
755 IF K$="Q" THEN GOTO 760
757 GOTO 50
760 RUN "A:UTILS"
```

APPENDIX 6

```
10 CLS
20 DATA 254,253,251,247,239,223,191,127,1,2,4,8,16,32,64,128
30 DIM T(7,1),V(15),V$(15),GRP(4)
40 FOR I=0 TO 7
50 READ T(I,0):NEXT I
60 FOR I=0 TO 7
70 READ T(I,1):NEXT I
80 PRINT:PRINT
90 PRINT "               ICVS/QUANTUM INSTANT VERIFICATION SYSTEM":PRINT
100 PRINT "                         RELEASE 1.0":PRINT
110 PRINT "                   COPYRIGHT 1990 QUANTUM SYSTEMS":PRINT:PRINT:PRINT

120 PRINT "                 1. INITIATE STATUS DOWNGRADE"
130 PRINT "                 2. INITIATE STATUS UPGRADE"
140 PRINT:INPUT "SELECT MODE > ",A$
150 IF A$="1" THEN A=0:GOTO 180
160 IF A$="2" THEN A=1:GOTO 180
170 GOTO 140
180 PRINT:PRINT "ENTER CREDIT CARD# > ";
190 FOR I=0 TO 15
200 V$(I)=INPUT$(1)
210 IF V$(I)="" THEN GOTO 200
220 PRINT V$(I);
230 IF (I=3) OR (I=6) OR (I=9) OR (I=12) THEN PRINT " ";
240 NEXT I
250 PRINT
260 FOR I=0 TO 15
270 IF V$(I)="0" THEN V(I)=0:GOTO 390
280 IF V$(I)="1" THEN V(I)=1:GOTO 390
290 IF V$(I)="2" THEN V(I)=2:GOTO 390
300 IF V$(I)="3" THEN V(I)=3:GOTO 390
```

```
310 IF V$(I)="4" THEN V(I)=4:GOTO 390
320 IF V$(I)="5" THEN V(I)=5:GOTO 390
330 IF V$(I)="6" THEN V(I)=6:GOTO 390
340 IF V$(I)="7" THEN V(I)=7:GOTO 390
350 IF V$(I)="8" THEN V(I)=8:GOTO 390
360 IF V$(I)="9" THEN V(I)=9:GOTO 390
370 PRINT:PRINT "INVALID ENTRY . . . ENTER AGAIN":BEEP:BEEP
380 FOR J=1 TO 1000:NEXT J:CLS:GOTO 80
390 NEXT I
400 GRP(0)=V(1)*100+V(2)*10+V(3)
410 GRP(1)=V(4)*100+V(5)*10+V(6)
420 GRP(2)=V(7)*100+V(8)*10+V(9)
430 GRP(3)=V(10)*100+V(11)*10+V(12)
440 GRP(4)=V(13)*100+V(14)*10+V(15)
450 PRINT:PRINT:PRINT "PROCESSING ... PLEASE WAIT":PRINT
460 ISSCODE$=V$(0)+V$(1)+V$(2)+V$(3)
470 IF V(0)=4 THEN ISOCODE$="ISOTC4": GOTO 500
480 IF V(0)=5 THEN ISOCODE$="ISOTC5": GOTO 500
490 PRINT "INVALID CARD NUMBER . . .":BEEP:GOTO 970
500 OPEN "A:\PRIMARY\"+ISOCODE$ AS #1 LEN=2
510 FIELD #1, 2 AS IX$
520 GET #1, GRP(0)+1
530 ST=CVI(IX$):CLOSE
540 IF ST=0 THEN PRINT "INVALID CARD NUMBER . . .":BEEP:GOTO 970
550 IF ST=1 THEN XFILE$="TAB1"
560 IF ST=2 THEN XFILE$="TAB2"
570 OPEN "A:\XYMT\"+XFILE$ AS #1 LEN=4
580 FIELD #1, 2 AS IX$, 2 AS KX$
590 GET #1, GRP(1)+1:R1=CVI(IX$):C1=CVI(KX$)
600 GET #1, GRP(2)+1:R2=CVI(IX$):C2=CVI(KX$)
610 GET #1, GRP(3)+1:R3=CVI(IX$):C3=CVI(KX$)
620 GET #1, GRP(4)+1:R4=CVI(IX$):C4=CVI(KX$)
630 CLOSE
640 IF (R1=77) OR (R2=77) OR (R3=77) OR (R4=77) THEN PRINT "INVALID CARD NUMBER . . .":BEEP: GOTO 970
650 MASK=(R1*4096)+(R2*256)+(R3*16)+R4
660 MASKNAME$=HEX$(R1)+HEX$(R2)+HEX$(R3)+HEX$(R4)
670 IREC=INT(MASK/8):JREC=MASK-IREC*8
680 OPEN "A:\INDEX\"+ISSCODE$ AS #1 LEN=2
690 FIELD #1, 2 AS IX$
700 GET #1, IREC+1
710 ST=CVI(IX$):CLOSE
720 ST=ST AND T(JREC,1)
730 IF ST=0 THEN PRINT "INVALID CARD NUMBER . . .":BEEP:GOTO 970
740 REC=(C1*64)+(C2*8)+C3
750 OPEN "A:\MASK\"+ISSCODE$+"\"+MASKNAME$ AS #1 LEN=2
760 FIELD #1, 2 AS IX$
770 GET #1, REC+1
780 ST=CVI(IX$):PS=ST AND T(C4,1)
790 IF A=0 THEN ST=ST AND T(C4,A)
800 IF A=1 THEN ST=ST OR T(C4,A)
810 LSET IX$=MKI$(ST)
820 PUT #1, REC+1:CLOSE
830 OPEN "A:\MASK\"+ISSCODE$+"\"+MASKNAME$ AS #1 LEN=2
840 FIELD #1, 2 AS IX$
850 GET #1, REC+1
860 NS=CVI(IX$):CLOSE
870 IF PS=0 THEN PS$="BAD" ELSE PS$="GOOD"
880 IF (NS AND T(C4,1))=0 THEN NS$="BAD" ELSE NS$="GOOD"
890 PRINT "PREVIOUS STATUS = ";PS$;"     NEW STATUS = ";NS$:PRINT
900 CCN$=V$(0)
910 FOR I=1 TO 15
920 CCN$=CCN$+V$(I)
930 IF (I=3) OR (I=6) OR (I=9) OR (I=12) THEN CCN$=CCN$+" "
940 NEXT I
950 IF A=0 THEN PRINT "CARD # ";CCN$;"   MASK # ";MASKNAME$;"   DOWNGRADE COMPLETE"
960 IF A=1 THEN PRINT "CARD # ";CCN$;"   MASK # ";MASKNAME$;"   UPGRADE COMPLETE"
970 BEEP:PRINT:PRINT "   . . . PRESS <RET> TO CONTINUE"
980 K$=INPUT$(1)
990 IF K$="" THEN GOTO 980
1000 CLS:GOTO 90
```

I claim:

1. A method for verifying credit status of a credit card comprising the steps of:
   a) entering a credit card number of a credit card to be verified into a system processor through a verification terminal;
   b) selecting a two-dimensional matrix of a plurality of rows and columns of cells containing multiple digit strings of numbers from a first memory file, said cells each having a row and column assignment, and said multiple digit strings being combinable to form a valid credit card number;
   c) separating the entered credit card number into a plurality of consecutive multiple digit strings by forming a first multiple digit string from a first plurality of consecutive digits in the credit card number, a second multiple digit string from a second plurality of consecutive digits in the credit card number, etc.;
   d) matching each of said consecutive strings with a corresponding multiple digit string contained in said two-dimensional matrix;
   e) determining the row and column assignments of the cells containing the corresponding multiple digit strings;
   f) employing the determined row and column assignments of said consecutive strings to i) select a mask matrix from a second memory file having a plurality of cells containing credit card status data, and ii) locate a cell within said mask matrix containing the status data of said credit card to be verified;
   g) determining a value of said status data corresponding to said credit card to be verified; and,
   h) outputting an indication of said determined value of said status data to said verification terminal.

2. The method of claim 1 wherein the step of employing the determined row and column assignments to select and locate comprises:
   i) forming a mask number from the row assignments of said consecutive strings, said mask number having a first digit equal to the row assignment of the first multiple digit string, a second digit equal to the row assignment of the second multiple digit string, etc.;
   ii) employing said mask number to select a mask matrix having a plurality of cells containing credit card status data for a plurality of credit card numbers corresponding to said mask number; and,
   ii) employing the column assignments of said consecutive strings to locate a cell within said selected mask matrix containing the status data of said credit card to be verified.

3. The method of claim 2 wherein said step of employing the column assignments further comprises using the following formula to determine a mask row number and mask column number corresponding to the cell in said mask matrix containing the credit status data of said credit card to be verified, where n is equal to the number of consecutive strings in the credit card number, b is the number of columns contained in the two-dimensional matrix and Ci is the column number corresponding to the ith string:

$$\text{mask row number} = \Sigma (b)^{n-j} c_i$$

$$i = 1 \text{ to } (n-1)$$

$$j = 2 \text{ to } n$$

$$\text{mask column number} = C_n.$$

4. The method of claim 2 wherein said step of forming a mask number further includes:
   checking a third memory file to determine whether said mask number is active or inactive; and,
   outputting an indication to said verification terminal that said credit card number is rejected if said mask number is determined to be inactive.

5. The method of claim 1 wherein the step of selecting a two-dimensional matrix further comprises employing a first plurality of digits in said entered credit card number identifying an issuer code to locate and select a corresponding two-dimensional matrix in said first memory file.

6. The method of claim 5 further including the steps of:
   i) comparing said first plurality of digits in said entered credit card number identifying an issuer code to a table of issuer codes stored in a third memory file; and,
   ii) outputting to said verification terminal an indication that said entered credit number is invalid if said first plurality of digits does not correspond to any user code in said table.

7. The method of claim 1 wherein the step of matching each of said consecutive strings further comprises outputting an indication to said verification terminal that said entered credit card number is invalid if a match is not found in said two-dimensional matrix for one or more of said consecutive strings.

8. The method of claim 1 wherein said step of determining a value of said status data further includes determining a credit limit corresponding to said credit card to be verified.

9. The method of claim 8 wherein said step of entering a credit card number further includes entering a purchase amount and said step of determining a value further includes comparing the credit limit to the purchase amount to determine if the purchase amount is authorized.

* * * * *